United States Patent
Austin

(10) Patent No.: US 6,836,993 B1
(45) Date of Patent: Jan. 4, 2005

(54) BI-DIRECTIONAL UNDERWATER ICEWALKER

(76) Inventor: Michael Austin, P.O. Box 58, Elmhurst, PA (US) 18416

( * ) Notice: Subject to any disclaimer, the term of this patent is extended or adjusted under 35 U.S.C. 154(b) by 18 days.

(21) Appl. No.: 10/708,885

(22) Filed: Mar. 30, 2004

(51) Int. Cl.$^7$ ............................................. A01K 97/01
(52) U.S. Cl. .................................. 43/4; 43/4.5; 43/27.2
(58) Field of Search ............................. 43/4, 4.5, 26.1, 43/27.2; 405/61; 280/841, 826

(56) References Cited

U.S. PATENT DOCUMENTS

| | | | |
|---|---|---|---|
| 2,845,742 A | | 8/1958 | Skillman |
| 2,904,919 A | | 9/1959 | Long |
| 3,001,313 A | | 9/1961 | Long |
| 3,481,064 A | * | 12/1969 | Newman .......................... 43/4 |
| 3,974,591 A | | 8/1976 | Ray |
| 4,157,229 A | * | 6/1979 | Kumm ....................... 405/185 |
| 4,642,932 A | | 2/1987 | Austin |
| 6,122,852 A | * | 9/2000 | Mechling, IV ................... 43/4 |

* cited by examiner

Primary Examiner—Michael J. Carone
Assistant Examiner—Bret Hayes
(74) Attorney, Agent, or Firm—Mitchell A. Smolow

(57) ABSTRACT

A bi-directional underwater icewalker is disclosed. The icewalker comprises a flotation base, a moveable rod connected to the underside of the base, a flotation arm attached to the rod containing a flotation arm skate and culminating in a spike at one end, a plurality of flotation base skates and a line attached to the bottom of the rod at one end and whose other end passes through an eyelet which is attached to the underside of the flotation base. By pulling on the line, the icewalker moves bi-directionally underneath a mass of ice.

21 Claims, 4 Drawing Sheets

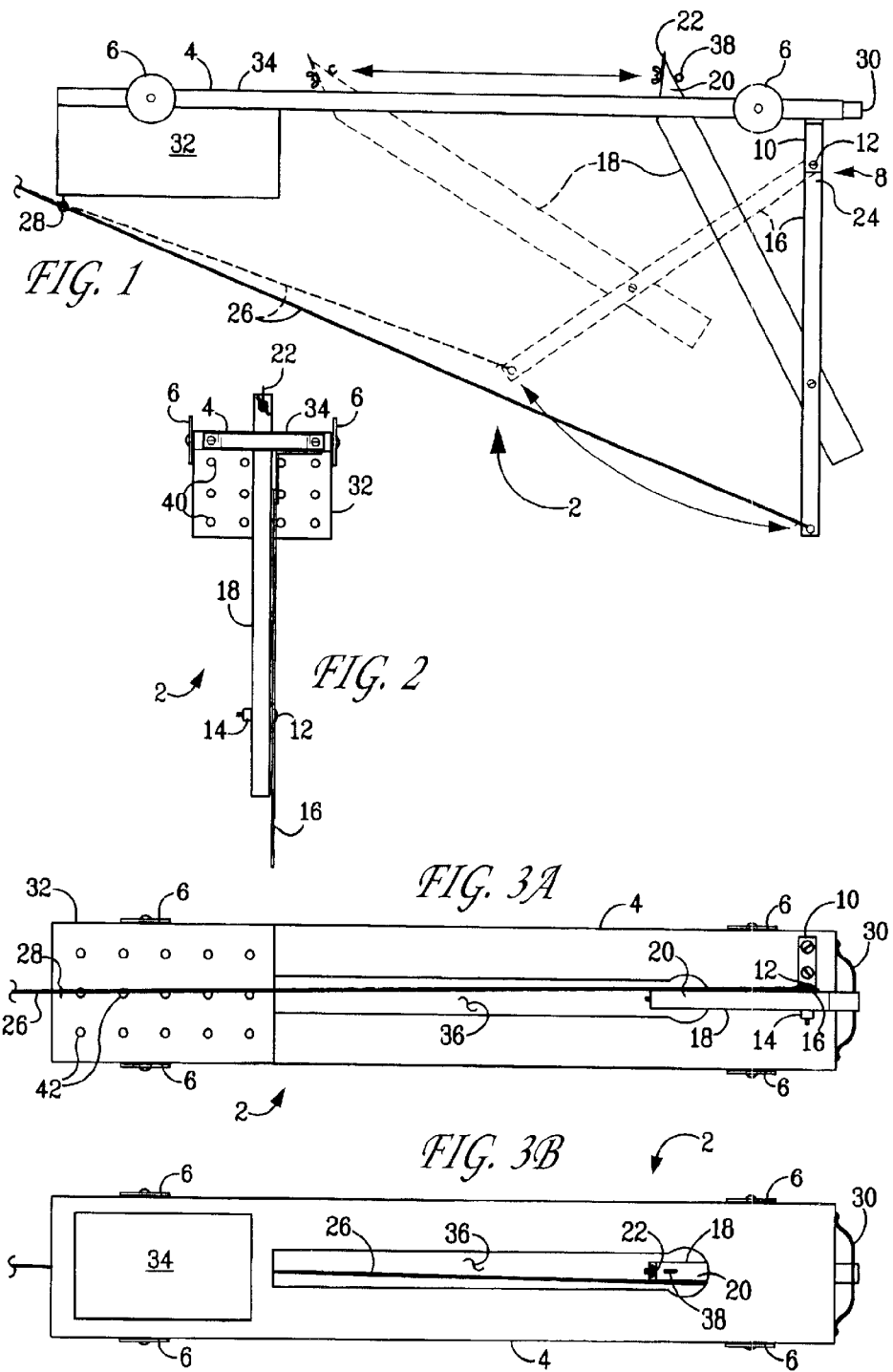

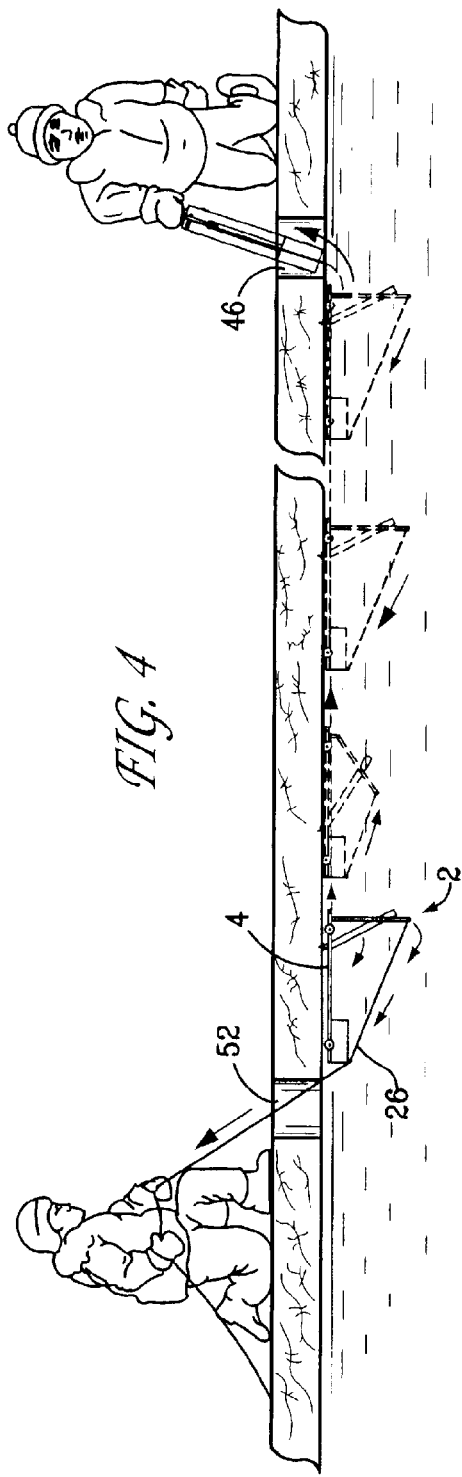
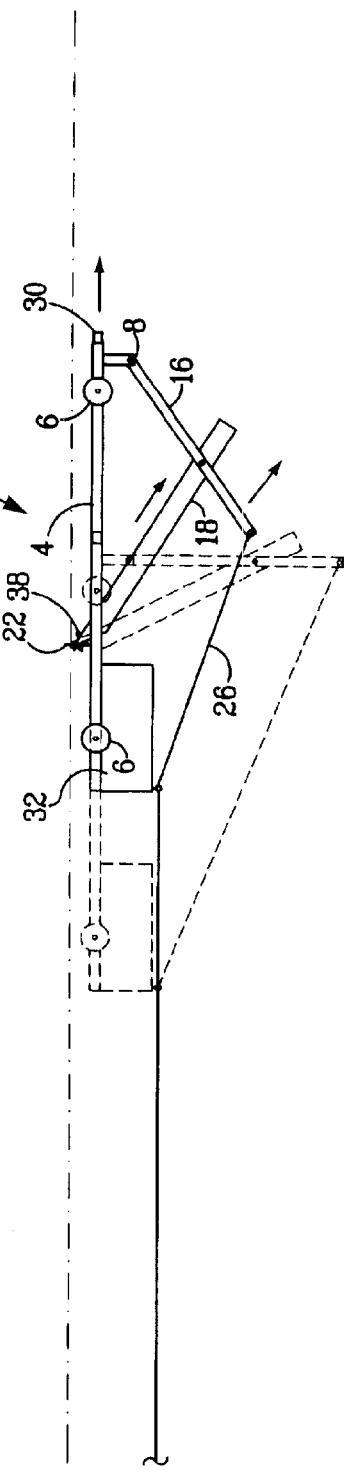

BI-DIRECTIONAL UNDERWATER ICEWALKER

BACKGROUND OF INVENTION

This invention relates to a device which is propelled on the underside of an ice mass formed on a body of water.

Often it is desirable to gain access to water laying underneath expansive ice blocks. Ice fishing, popular in the winter months in colder climates when the ice is thick enough to walk on, is one example. Traditionally, ice fishing utilizes tip-ups or jigging to hold the fishing line and/or alert the sportsman to a strike. Both of these items require the drilling of a hole in the ice and suspending bait dropped down the ice hole. In the first method the bait is suspended by a line from the tip-up. With jigging, the bait is attached to a line and moved up and down by the fisherman. In both cases the area being fished is limited to the water directly beneath the ice hole.

Unfortunately, during ice fishing and other activities involving walking onto ice there is always risk that the ice may weaken causing the sportsman to fall into the water. Because of the rapid cooling effect of cold water, hypothermia with resulting death can occur very quickly. Thus, it is important that methods to extract a partially or completely submerged sportsman be immediately available. Frequently, the only help available is a fellow sportsman.

In my U.S. Pat. No. 4,642,932, I describe an underwater icewalker used to extend various activities to areas lying under ice which were previously accessible only by submarines or divers. In particular, my invention permitted an ice fisherman to extend his bait beyond the water directly beneath the ice hole.

However, I have since discovered that the design of the icewalker of my U.S. Pat. No. 4,642,932 does not allow for bi-directional movement of the icewalker, making retrieval difficult. Other problems, such as snagging on the ice underside surface resulting in the icewalker tipping over have been encountered.

Accordingly, there remains a continuing need for improved methods to extend various activities to areas lying under ice. The present invention fulfills this need, and further provides related advantages.

SUMMARY OF INVENTION

It is an object of the present invention to extend various activities to areas lying under ice. In particular, the icewalker of the present invention enables the ice fisherman to greatly increase the fishing area over that ordinarily available using traditional methods of ice fishing, while at the same time allowing for easy retrieval of the icewalker.

This is accomplished by utilizing a bi-directional underwater icewalker which comprises a flotation base constructed of lightweight water-resistant material; a moveable rod connected to the flotation base; a moveable flotation arm connected to the rod at one end and culminating in a spike for engaging the underside of the ice at the other end; a plurality of flotation base skates connected to the flotation base; a flotation arm skate connected to the flotation arm; and a line attached to the rod. The flotation arm skate is positioned such that when the icewalker is in bi-directional mode, the flotation base skates and floatation arm skate are in contact with the underside of the ice, while the spike is not.

After drilling an access hole in the ice, the icewalker is positioned beneath the ice. By pulling on the line, the rod moves back, causing the spike to engage the ice and the plurality of flotation base skates to act as runners, thereby moving the icewalker forward. Releasing the line allows the icewalker to assume a stationary position. The task of pulling on the line may be performed as many times as the fisherman desires in order to reach a particular destination under the ice. By exerting slow, gentle pressure on the line, the icewalker may be placed in bi-directional mode allowing for easy retrieval or reverse positioning of the icewalker.

Optionally, a holding box is added to the rear of the icewalker and is used to hold any item the user desires to transport, for example, chum.

Alternatively, a second ice hole is drilled, the icewalker is directed to the second ice hole for attachment of a second line, and the icewalker is pulled back and forth beneath the ice. Thus, the area covered in this way by two fishermen is of an immeasurably greater magnitude than that available by drilling a single hole in the ice.

Another object of this invention is to provide transport for a life saving device to someone who has fallen through the ice. The icewalker, being moveable under ice, can be used to convey such equipment directly or by attachment to the line which is attached to it. The icewalker, because of its ability to float, can itself also serve as a life saving device.

A further object is to deliver equipment for studying ecological and environmental factors which exist below the ice. For example, the icewalker may be equipped with a camera for taking pictures, or a drag line for collecting sediment or water samples.

A still further object is to provide a device which is compact, simple to operate and inexpensive to manufacture.

Other features and advantages of the present invention will be apparent from the following more detailed description of the preferred embodiments, taken in conjunction with the accompanying drawings which illustrate, by way of example, the principles of the invention.

BRIEF DESCRIPTION OF DRAWINGS

FIG. 1 is a side view of the underwater icewalker.

FIG. 2 is a front view of the underwater icewalker.

FIG. 3a is a bottom view of the underwater icewalker.

FIG. 3b is a top view of the underwater icewalker.

FIG. 4 is a schematic representation of the method of placing and, moving the icewalker.

FIG. 5 is a side view of the icewalker showing walker at the start and at the end of a single pulling stroke.

DETAILED DESCRIPTION

Figure 8:
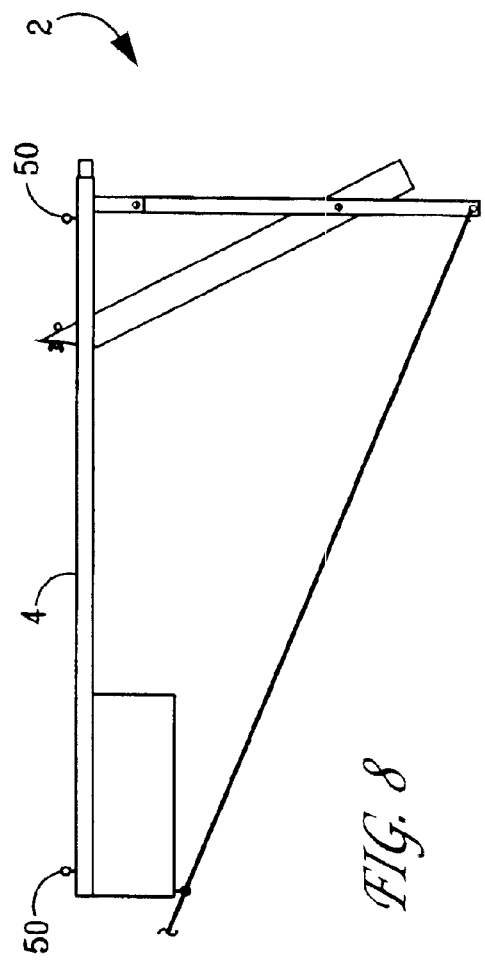
FIG. 8 is a side view of the icewalker substituting eyelets for the washers.

Referring to FIGS. 1, 2 and 3, attached to flotation base 4 of underwater icewalker 2 are a plurality of, preferably four, flotation base skates 6. Flotation base skates 6 are positioned to contact the ice undersurface and are a predetermined shape that allows for non-binding forward and reverse movement of flotation base 4. Flotation base skates 6 may be, for example, washers attached to flotation base 4 sides, or eyelets 50 (FIG. 8) attached to flotation base 4 top.

Hinge 8, for example, a 90 degree bracket 10, bolt 12 and nut 14 support hinge end 24 of moveable rod 16. Movable rod 16 is fabricated of a non-floating material, for example, metal. Moveable flotation arm 18 is movably fastened to, for example, by bolt 12 and nut 14 to movable metal rod 16. Embedded in an ice contacting end 20 of moveable flotation arm 18 is spike 22. Also attached to movable flotation arm 18 is flotation skate 38. Flotation skate 38 is a predetermined shape, for example, an eyelet, that allows for non-binding forward and reverse movement of flotation base 4 and is positioned to contact the bottom surface of the ice to disengage ice contacting end 20 at the completion of a forward travel cycle (described below). Optionally, flotation skate 38 is height adjustable.

Attached to the bottom of moveable metal rod 16 is line 26. Line 26 passes through eyelet 28 which is attached to the under side of the rear end of flotation base 4. Attached, for example, by screws, to the front of flotation base 4 is optional handle 30. Optional holding box 32 is contained within flotation base 4 and covered with lid 34, located so as not to interfere with the travel of rod 16. The center of flotation base 4 is cut out at 36 so as to allow spike 22 attached to flotation arm 18 to engage the under side of the ice. Cut-out 36 also acts as a groove that prevents a lateral displacement of moving flotation arm 18.

Preferably, flotation base 4 and flotation arm 18 are made of buoyant material, for example wood or plastic. The dimensions of the flotation base are limited only by the physical dimension of ice hole 52 (FIG. 4). Preferably, flotation base 4 is rectangular in shape, about 4¾ inches in width, 24 inches in length and ¾ inches in thickness. The dimension of cut-out 36 is about 2 inches by 17 inches.

FIGS. 4 and 5 illustrate the use of icewalker 2. In FIG. 5, dashed lines show icewalker 4 at the start of the pulling stroke. Solid lines represent icewalker 4 at the end of the pulling stroke.

After drilling hole 52 in the ice at the starting location, icewalker 4 is immersed in the water through ice hole 52, facing in the direction in which it is to be propelled. The buoyancy of flotation base 4 causes icewalker 4 to press up against the underside of the ice. Gravity causes rod 16 to drop to a vertical position. Flotation arm 18 attached to rod 16 floats up until flotation spike 22 attached to flotation arm 18 contacts the ice undersurface. The icewalker is now ready to be propelled.

By pulling on the line 26, rod 16 moves back toward the underside of flotation base 4. In so doing, it places pressure on the flotation arm 18 pushing spike 22 attached to flotation arm 18 against and engaging the ice undersurface. By performing this task, icewalker 4 advances by sliding forward around moveable flotation arm 18 and spike 22. As icewalker 2 advances, flotation arm 18 pivots on spike 22 until flotation skate 38 contacts the ice undersurface dislodging spike 22. Line 26 is let loose, allowing gravity to once again cause rod 16 to drop down to the vertical position. Alternatively, rod 16 may return through the use of, for example, a spring activated hinge 8.

As rod 16 reaches the vertical position, flotation arm 18 floats upward until spike 22 attached to flotation arm 18 once again contacts the ice undersurface. By pulling on line 26, rod 16 once again moves back toward the underside of flotation base 4 and spike 22 once again engages the ice undersurface at the new advanced position. The task of pulling on line 26 to engage spike 22 can be performed as many times as the sportsman desires in order to reach a destination under the ice.

To reverse direction of icewalker 2, line 26 is pulled in a steady motion such that icewalker slides along in reverse direction on ice undersurface supported by flotation base skates 6 and flotation arm skate 38 without causing spike 22 to engage the ice undersurface. Flotation arm skate 38 will ride against the ice undersurface, keeping spike 22 from engaging the ice undersurface.

Figure 6:
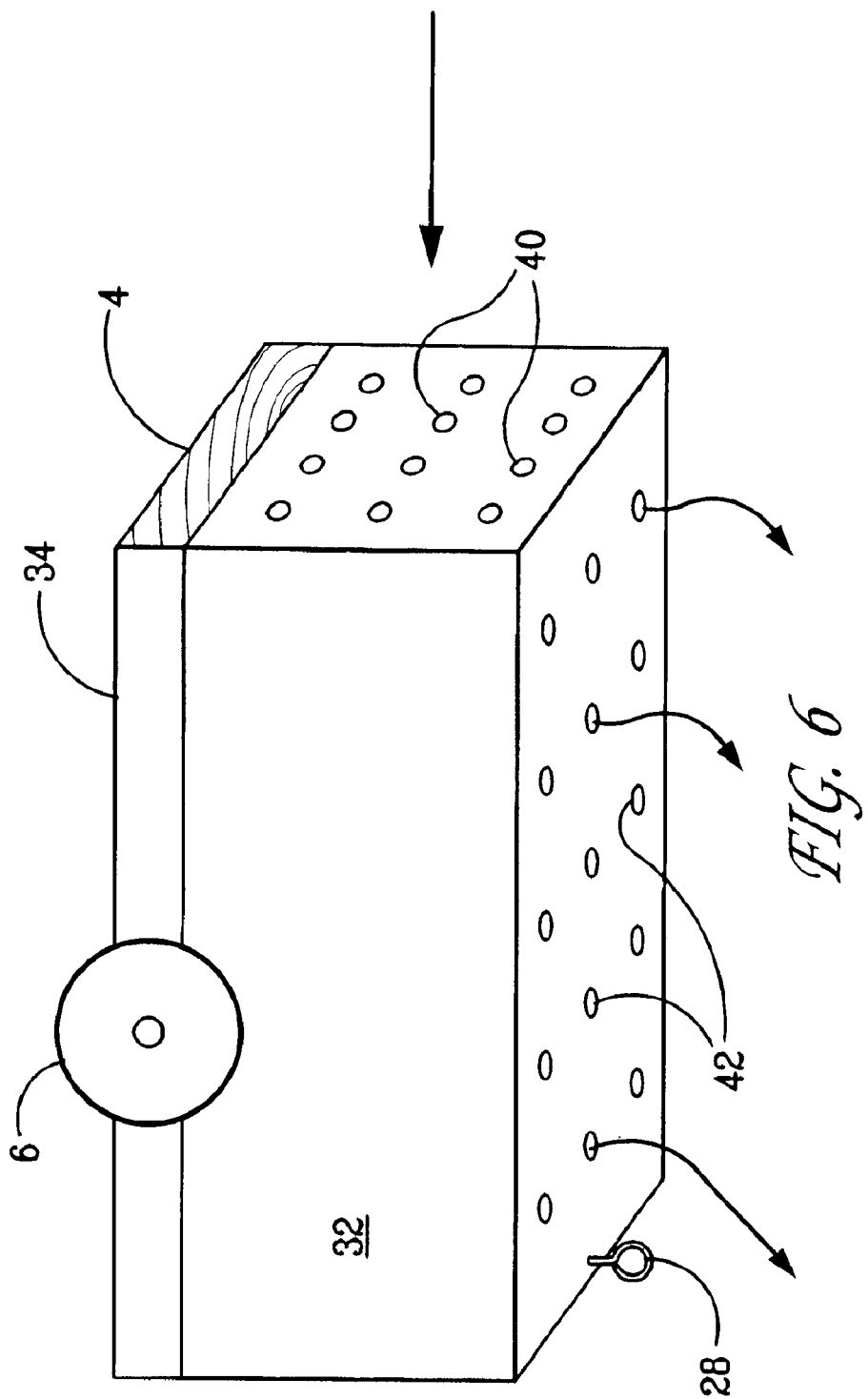
FIG. 6 is a perspective view of the holding box.

Referring to FIG. 6, optional holding box 32 with lid 34 is used to hold any item the user wishes to transport, for example, chum used for fishing. As the icewalker moves forward, the flow of water through front holes 40 in the front of holding box 32 releases the chum through bottom holes 42 in the bottom of holding box 32. In this manner, chum is released each time icewalker 2 moves forward, thereby attracting fish.

Figure 7:
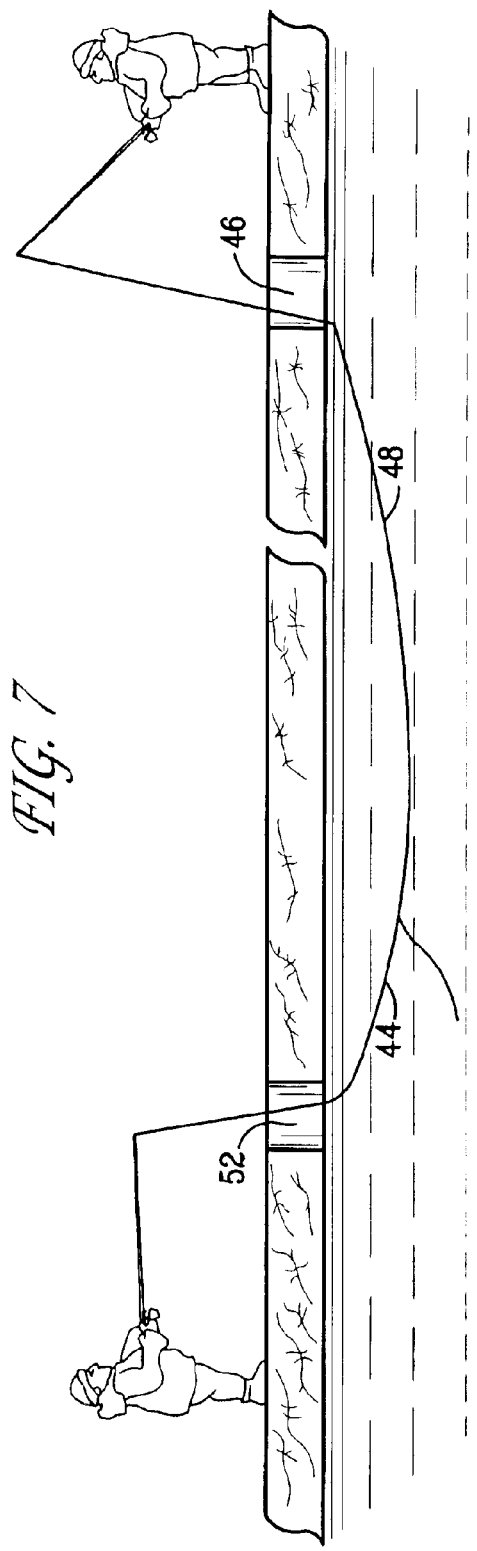
FIG. 7 illustrates a mode of fishing that can be established with the icewalker.

Icewalker 2 may be utilized to allow two fishing lines to be attached to each other and pulled back and forth beneath the ice as shown in FIG. 7. The use of icewalker 4 allows for attachment of two fishing lines together so that they are beneath a solid mass of ice. A bait (not shown) may be attached to the connected fishing lines and run back and forth below the ice mass for a distance equal to that traveled by the icewalker.

To connect two fishing lines together beneath the ice, the sportsman attaches first fishing line 44 to icewalker 2. First fishing line 44 may, for example, be attached to line 26 (FIG. 1), or first fishing line 44 may itself be utilized as line 26, attached directly to icewalker 2. Icewalker 2 is then used to transport first fishing line 44 to second ice hole 46. Using handle 30, icewalker 2 is pulled through second ice hole 46. First fishing line 44 is detached from icewalker 2 and reattached to second fishing line 48. Both lines are then pulled back under the ice. The distance under the ice between two ice holes may now be fished by attaching a connecting device, for example, a 3-way swivel and bait to the connected fishing lines and dropping it down the ice hole. By reeling the line back and forth between two sportsmen with the bait at the depth the user desires, a large area can be covered, thereby enhancing the sportsman's opportunity to catch more fish.

Icewalker 2 can also be used to transport a life saving device to a victim who has fallen through the ice. By attaching a life saving device to, for example, icewalker 2 or line 26 and propelling icewalker 2 to the victim, icewalker 2 can be used to convey a life saving device to the victim without endangering the rescuers.

Due to its flotation property, icewalker 2 itself may serve as a life saving device. For use with rescue, icewalker 2 is constructed to a predetermined scale large enough to hold a victim afloat or to carry life saving equipment.

In yet another use, research equipment, for example, a camera for taking photographs of marine life under the ice, is attached to icewalker 2. Other equipment, such as a drag line may be attached for collecting bottom or water samples for ecological or other studies.

Thus, the present invention allows the effective attainment of may pursuits and activities that were either impossible or very much limited using known methods.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A self-propelled device for bi-directional movement across a bottom surface of a block of ice disposed over water comprising:

a flotation base having a plurality of bi-directional non-binding flotation base skates attached thereto;

a rod pivotally attached to the flotation base; and a flotation arm having a bi-directionally non-binding flotation arm skate attached thereto, the flotation arm skate positioned to contact the bottom surface of the ice to disengage a flotation arm contacting end at the completion of a forward travel cycle;

wherein the flotation arm is secured to the rod for propelling the base across the bottom surface of the ice when the rod rotates upwardly with respect to the base, the rod having a first position extending downwardly from the base and a second upper position at an angle with respect to the first position, the flotation arm being constructed and arranged to engage and push against the bottom surface of the ice to propel the base as the first member rotates from the first position to the second position.

2. The device of claim 1 wherein the rod comprises an end connected to the base rotatably along a horizontal axis, the rod having a first position in which the rod is substantially vertical extending downwardly from the base and a second position at a vertical angle with respect to the first position.

3. The device of claim 1 wherein a hinge pivotally attaches the rod to the base.

4. The device of claim 1 wherein the flotation base and flotation arm are made of a material selected from the group consisting of wood, plastic and combinations thereof.

5. The device of claim 1 wherein the rod is heavier than water and the flotation arm is lighter than water, whereby the rod returns from the second position to the first position due to gravity.

6. The device of claim 1 wherein the rod returns from the second position to the first position due to a spring hinge.

7. The device of claim 1 wherein the rod is made of metal.

8. The device of claim 1 wherein the flotation base has a cut-out, wherein the arm extends through the cut-out.

9. The device of claim 1 wherein the flotation arm contacting end comprises at least one spike.

10. The device of claim 9 wherein the spike height is adjustable.

11. The device of claim 1 further comprising a line attached to the bottom of the moveable rod at a first end and whose other end passes through an eyelet which is attached to the underside of the rear end of the flotation base for rotating the arm and rod thereby moving the base.

12. The device of claim 1 further comprising a handle attached to the flotation base.

13. The device of claim 1 further comprising a holding box adapted to selectively release a material as the base moves across the bottom surface of the ice.

14. A self-propelled device for bi-directional movement across a bottom surface of a block of ice disposed over water comprising:

a flotation base having a plurality of bi-directional non-binding flotation base skates attached thereto;

a rod pivotally attached to the flotation base;

a flotation arm having a bi-directional non-binding flotation arm skate attached thereto, the flotation arm skate positioned to contact the bottom surface of the ice to disengage a flotation arm contacting end at the completion of a forward travel cycle; and a line attached to the bottom of the moveable rod at a first end and whose other end passes through an eyelet which is attached to the underside of the rear end of the flotation base for rotating the arm and rod;

wherein the flotation arm is secured to the rod for propelling the base across the bottom surface of the ice when the rod rotates upwardly with respect to the base, the rod having a first position extending downwardly from the base and a second upper position at an angle with respect to the first position, the flotation arm being constructed and arranged to engage and push against the bottom surface of the ice to propel the base as the first member rotates from the first position to the second position, the rod being heavier than water and the flotation arm being lighter than water, whereby the rod returns from the second position to the first position due to gravity.

15. The device of claim 14 further comprising a handle attached to the flotation base.

16. The device of claim 14 wherein the flotation base contains a holding box adapted to selectively release a material as the base moves across the bottom surface of the ice.

17. The device of claim 14 wherein the material is selected from one of the group consisting of chum, a life saving device and research equipment.

18. A method for bi-directionally traversing across a bottom surface of a block of ice disposed over water comprising the steps of:

cutting a hole in the block of ice;

inserting a bi-direction icewalker, the icewalker comprising a flotation base having a plurality of bi-directional non-binding flotation base skates attached thereto;

a rod pivotally attached to the flotation base;

a flotation arm having a bi-directional non-binding flotation arm skate attached thereto, the flotation arm skate positioned to contact the bottom surface of the ice to disengage a flotation arm contacting end at the completion of a forward travel cycle; and a line attached to the bottom of the moveable rod at a first end and whose other end passes through an eyelet which is attached to the underside of the rear end of the flotation base for rotating the arm and rod;

wherein the flotation arm is secured to the rod for propelling the base across the bottom surface of the ice when the rod rotates upwardly with respect to the base, the rod having a first position extending downwardly from the base and a second upper position at an angle with respect to the first position, the flotation arm being constructed and arranged to engage and push against the bottom surface of the ice to propel the base as the first member rotates from the first position to the second position, the rod being heavier than water and the flotation arm being lighter than water, whereby the rod returns from the second position to the first position due to gravity;

attaching a hook and bait to the line; and pulling on the line to propel the icewalker.

19. The method of claim 18 further comprising the step of releasing a material as the base moves across the bottom surface of the ice.

20. The method of claim 19 wherein the flotation base contains a holding box adapted to selectively release the material.

21. The method of claim 18 further comprising the steps of:

drilling a second ice hole;

propelling the icewalker to the second hole;

removing the icewalker;

attaching a second line to the line; and pulling the line and second line back and forth beneath the ice.

\* \* \* \* \*